United States Patent [19]

Ruff

[11] Patent Number: 5,103,653
[45] Date of Patent: Apr. 14, 1992

[54] ICEMAKER/WATER PURIFIER WITH CONVECTIVE MELTING

[75] Inventor: John D. Ruff, Alexandria, Va.

[73] Assignee: Thermadyne, Inc., Alexandria, Va.

[21] Appl. No.: 647,422

[22] Filed: Jan. 29, 1991

Related U.S. Application Data

[60] Continuation-in-part of Ser. No. 471,884, Jan. 29, 1990, Pat. No. 5,011,524, which is a division of Ser. No. 278,447, Dec. 1, 1988, Pat. No. 4,897,099.

[51] Int. Cl.$^5$ .................................................. C02F 1/22
[52] U.S. Cl. ......................................... 62/532; 62/124
[58] Field of Search ........................... 62/123, 124, 532

[56] References Cited

U.S. PATENT DOCUMENTS

| | | | |
|---|---|---|---|
| 2,066,431 | 1/1937 | Taylor | 62/123 |
| 2,691,275 | 10/1954 | Andrews | 62/123 X |
| 2,775,100 | 12/1956 | Howe | 62/123 X |
| 3,398,805 | 8/1968 | Waller | 141/83 X |
| 3,488,974 | 1/1970 | Lunde et al. | 62/123 |
| 3,885,937 | 5/1975 | Norris | 62/137 |
| 4,262,489 | 4/1981 | Sakamoto | 62/124 |
| 4,370,865 | 2/1983 | Hebino et al. | 62/124 |

Primary Examiner—William E. Tapolcai
Attorney, Agent, or Firm—Epstein, Edell & Retzer

[57] ABSTRACT

A refrigeration system employed as an icemaker, in which part of the ice so produced is stored in a bin, and in which, part of the ice is then melted to provide a supply of purified water in a container. In one embodiment convection flow of air conveys heat from the ambient room environment to the bottom of the ice bin to achieve this melting. In a second embodiment a convection flow of water is employed for this purpose. Controls are provided to automatically control melting, to maintain a predetermined level in the purified water container.

1 Claim, 3 Drawing Sheets

ICEMAKER/WATER PURIFIER WITH CONVECTIVE MELTING

CROSS-REFERENCE TO RELATED APPLICATION

This application is a Continuation-In-Part of my copending U.S. patent application Ser. No. 07/471,884 filed Jan. 29, 1990, now U.S. Pat. No. 5,011,524, which is a divisional application of my prior U.S. patent application Ser. No. 07/278,447, filed Dec. 1, 1988, now U.S. Pat. No. 4,897,099. The entire disclosure in that patent is expressly incorporated herein by this reference.

BACKGROUND OF THE INVENTION

The present invention relates to a method and apparatus for providing purified ice pieces and purified liquid water from a source of unpurified liquid water. More particularly, the present invention provides an alternative approach to melting ice pieces in a method and apparatus of the type generally disclosed in my aforementioned U.S. Pat. No. 4,897,099.

In my U.S. Pat. No. 4,897,099 I disclose a method and apparatus for forming purified ice pieces from unpurified water, such as tap water. The ice pieces are periodically harvested and collected in a bin, the bottom of which is heated as necessary to melt desired quantities of the ice to provide a supply of purified water.

In the embodiment disclosed in FIG. 2 of my aforesaid patent, heat for melting the ice is derived from a flow of room air, propelled by a fan and conducted along the bottom of the ice bin.

The present invention provides the alternative method of transferring heat from the room environment to the bottom of the bin by convective fluid flow, and controlling this heat transfer by a flow control device such as an air damper or a water valve.

OBJECTS AND SUMMARY OF THE INVENTION

It is an object of the present invention to provide an alternative method and apparatus to that disclosed in my U.S. Pat. No. 4,897,099 for applying thermal energy to a collection bin for purified ice, thereby melting some of the ice to provide and collect purified water.

In accordance with the present invention, a fluid medium such as air, or water, is brought in contact with the bottom of the ice bin. As ice is melted in the bin the fluid is cooled, thus becoming denser and heavier. It then falls in a convective downward flow through an air duct or a water pipe to a lower height level where it encounters a like fluid which has been warmed by the room environment and is thus less dense and lighter. As this fluid moves downwardly away from the bin bottom in the duct or pipe, it is replaced by warmer fluid which has been warmed by the room environment. This influx of warm fluid provides more heat to melt ice, and is in turn cooled and flows downward through the duct or pipe. In this way a continuous ice melting and fluid flow is established.

BRIEF DESCRIPTION OF THE DRAWINGS

These and other objects, features and many of the attendant advantages of the present invention will be appreciated more readily as they become better understood from a reading of the following description considered in connection with the accompanying drawings wherein like parts in each of the several figures are identified by the same reference numerals, and wherein.

DESCRIPTION OF THE PREFERRED EMBODIMENTS

Figure 1:
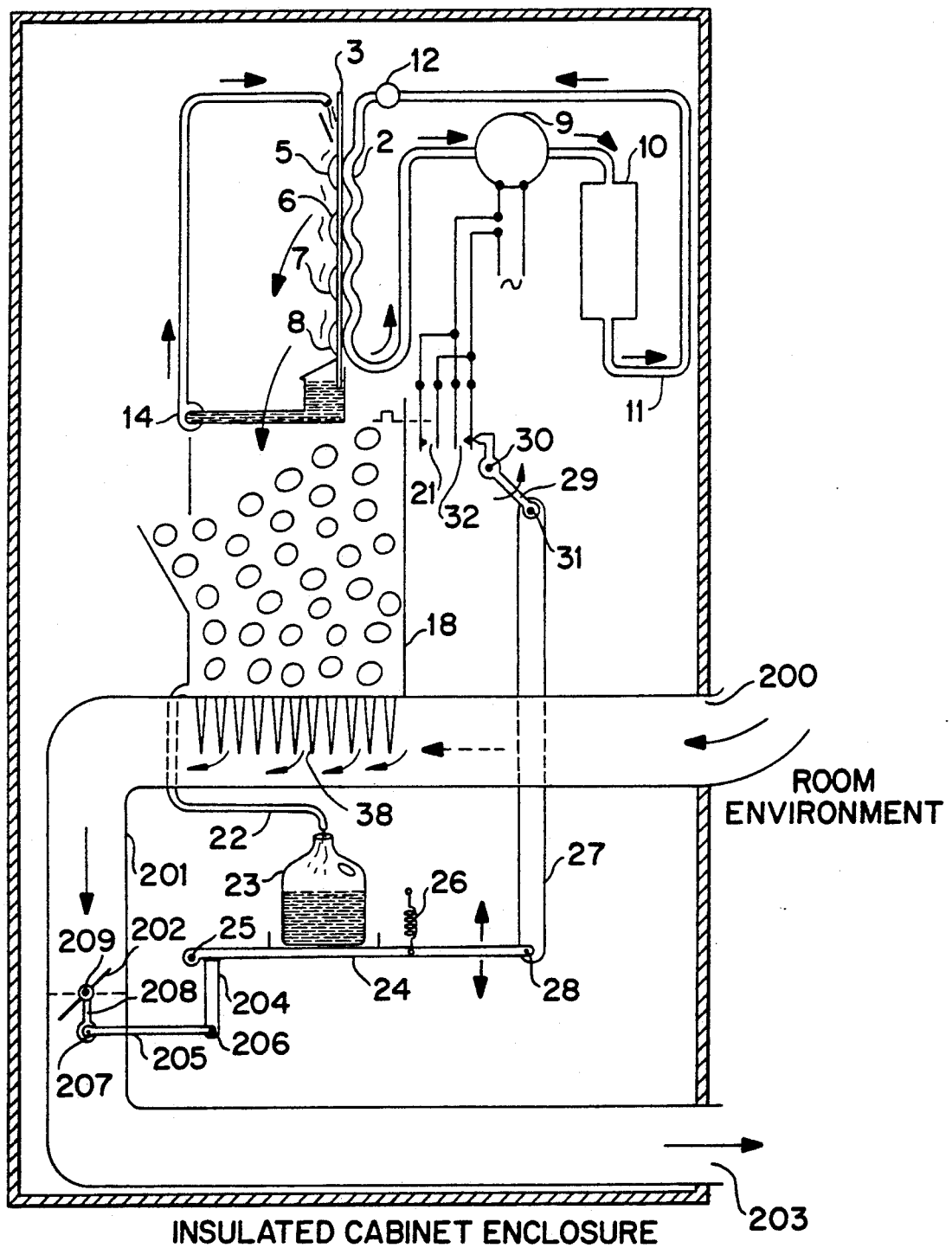
FIG. 1 is a schematic flow diagram of a system constituting one embodiment of the present invention.

In order to facilitate reference to the disclosure material incorporated herein from my U.S. Pat. No. 4,897,099, two-digit reference numerals appearing in the accompanying drawing are chosen to correspond to those reference numerals employed in the aforesaid patent for like elements. Three-digit reference numerals appearing in the accompanying drawings designate elements not present in the aforesaid patent. In the interest of brevity, and to facilitate understanding of the subject matter of the present invention, the following description omits discussion of the portions of the system not directly related to the invention subject matter.

Referring now to FIG. 1 of the accompanying drawings, the overall ice-forming and melting system is illustrated schematically. Compressor 9 draws refrigerant vapor from evaporator 2 and discharges it to condenser 10. Liquid refrigerant flows via liquid line 11 and metering device 12 back to evaporator 2, in a continuous refrigeration cycle. Water pressurized by pump 14 flows over plate 3, and ice pieces 5, 6, 7 and 8 are formed. When periodic harvesting is initiated, the ice pieces fall into bin 18. Bin switch 21 remains closed and thus keeps compressor 9 energized until the level of ice in bin 18 reaches the sensor element of bin switch 21, at which time the switch opens and de-energizes compressor 9. Should the ice level at bin switch 21 drop at a later time, it would close again and re-energize compressor 9. At selected times the ice collected in bin 18 is heated by a flow of ambient air warmed by the room environment and entering inlet duct 200 so as to flow in contact with heat exchange fins 38. Inlet duct 200 slopes downward from its intake to help establish a convective flow by preventing backflow. After contact with fins 38, this cooled air flows downward through down-duct 201, through damper 202, and through discharge duct 203, to mix with ambient air warmed by the room environment. A continuous convective flow is thus established.

Any ice which melts in bin 18 drains through a pipe 22, having its inlet at the bottom of the bin, into a bottle 23 or other container resting on a platform 24 hinged at a positionally fixed point 25. By "positionally fixed" it is meant that the hinge or pivot point 25 is stationary relative to the common cabinet or housing for all of the components described herein. If bottle 23 is less than full, its weight is overcome by the resilient bias force of a balance spring 26 pulling platform 24 counter clockwise (as viewed in the drawing) to swing the platform upwardly. This upward movement causes an upward movement of control link 27 connected to platform 24 at connecting pivot 28, the latter being movable relative to the common system housing. Upward movement of control link 27 causes counter-clockwise rotation of a rocker arm 29 about a fixed pivot point 30 to which it is connected at a movable pivot point 31. The rotation of rocker arm 29 causes an override switch 32 to close, thereby bypassing bin switch 21 and permitting compressor 9 to run regardless of the state of the bin switch. Extension arm 204 is attached to platform 24, and control link 205 is connected to it at movable pivot point 206. Control link 205 connects at movable pivot point 207 to control arm 208 to actuate damper 202 about fixed pivot point 209, so that when platform 24 is in the upward position, damper 202 is open. In this way, when bottle 23 is less than full, damper 202 is open and melting of ice by convective air flow continues. Ice resting on the bottom of bin 18 is thus melted at a relatively fast rate and the resulting water is drained via pipe 22 into bottle container 23.

As ice melts at the bottom of the bin, the weight of the ice pieces in the bin causes more ice pieces to continually move downwardly to the bin bottom. Meanwhile, the ice-making function continues, providing a supply of fresh ice pieces that are collected in the bin. When container 23 is full, its weight overcomes the bias force of balance spring 26 and causes platform 24 to drop (i.e., pivot clockwise about fixed pivot 25). This movement, transmitted via extension arm 204, control link 205 and control arm 208, causes damper 202 to move to a closed position, thus interrupting the convective air flow and the melting of ice in bin 18. Also, the downward movement of platform 24 is transmitted via control link 27 and rocker arm 29 to the override switch 32 which opens and leaves control of ice making to bin switch 21. The use of control link 205 to couple movements of platform 24 and damper 202 could be replaced by other practical, alternative means of achieving such a coupling. As an additional alternative precaution, for higher overall efficiency, a similar damper might be added to the inlet duct 200 and coupled in the same manner.

Figure 2:
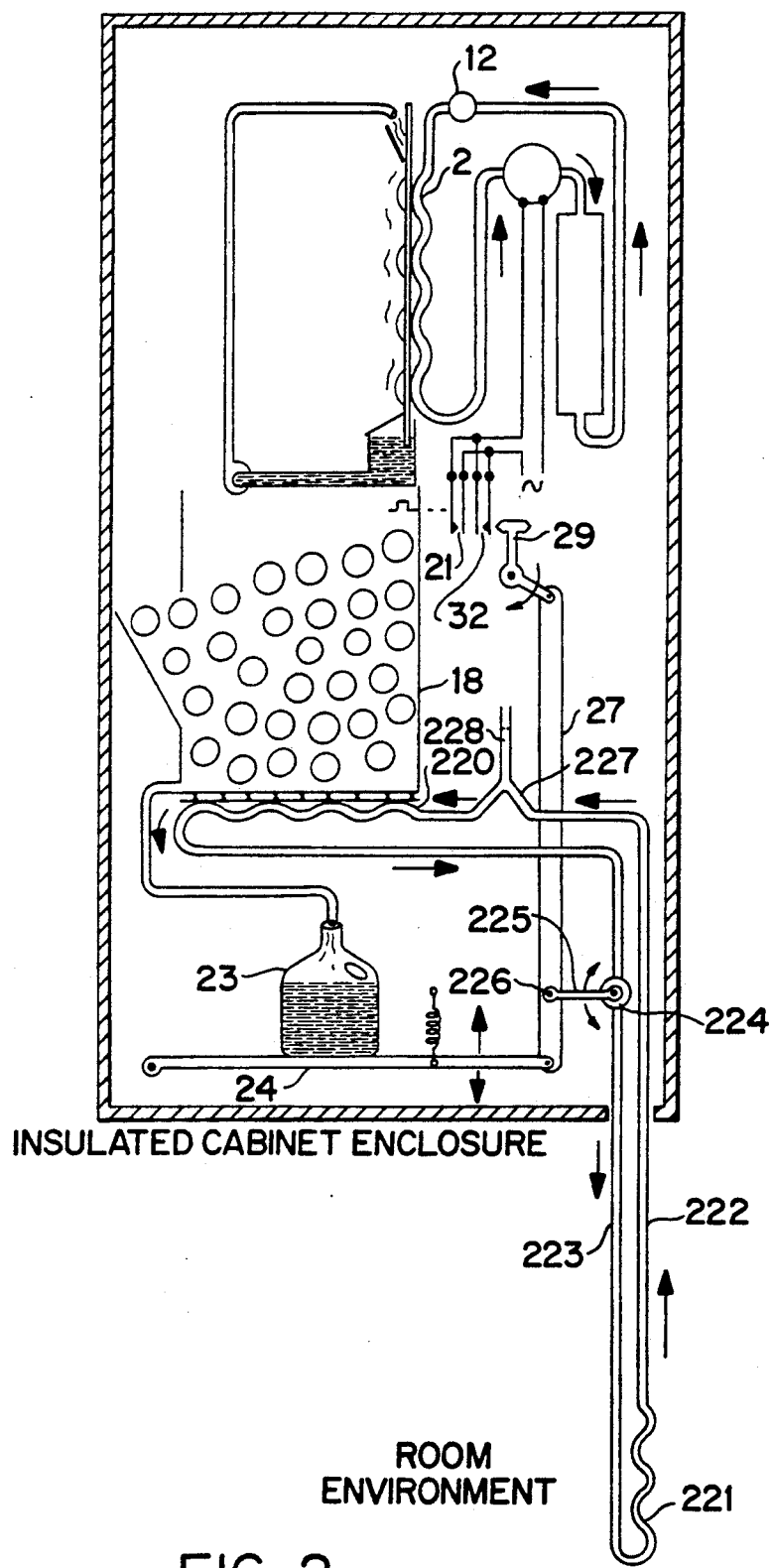
FIG. 2 is a schematic flow diagram of a second embodiment of the system of the present invention.

FIG. 2 illustrates an embodiment in which the ice melting, convective flowing medium is water. Heat exchange tube 220 is in contact with the bottom of bin 18. Warming coil 221 is in the room environment, outside of the insulated cabinet enclosure. Supply pipe 222 and return pipe 223 connect heat exchange tube 220 and warming coil 221, and all of these connected components are filled with water, or some other suitable liquid. Valve 224 is capable of shutting off flow in return pipe 223, and is actuated by a control arm 225 connected to control link 27 at movable pivot point 226. All other features of the system in this embodiment are the same as described in the embodiment of FIG. 1.

In operation, when bottle 23 is less than full, platform 24 and control link 27 are in their upward positions, as described earlier. This upward position of control link 27 causes control arm 225 to hold valve 224 in the open position. Water in heat exchange tube 220 is cooled by the presence of ice in bin 18 and flows downward in convective flow, through the open valve 224 and return pipe 223, to warming coil 221. Since warming coil 221 is located in the warmer room environment, the returning water is warmed, and then rises, flowing through supply pipe 222 to heat exchange tube 220 to supply more heat for ice melting, thus establishing a continuous convective flow and melting function. A raised section 227 of supply pipe 222 helps to establish a convective flow by preventing backflow. Standpipe 228 helps maintain water level in the convection loop by allowing for expansion. The melting function continues until bottle 23 is full, at which time platform 24 and control link 27 move downwards causing valve 224 to move to the closed position. This interrupts the convective flow, causing the melting function to cease. The use of control arm 225, to couple movements of platform 24 and valve 224, could be replaced by other practical, alternative means of achieving such a coupling. As an additional alternative precaution, for higher overall efficiency, a similar valve might be added in supply pipe 222 and coupled in the same manner.

Figure 3:
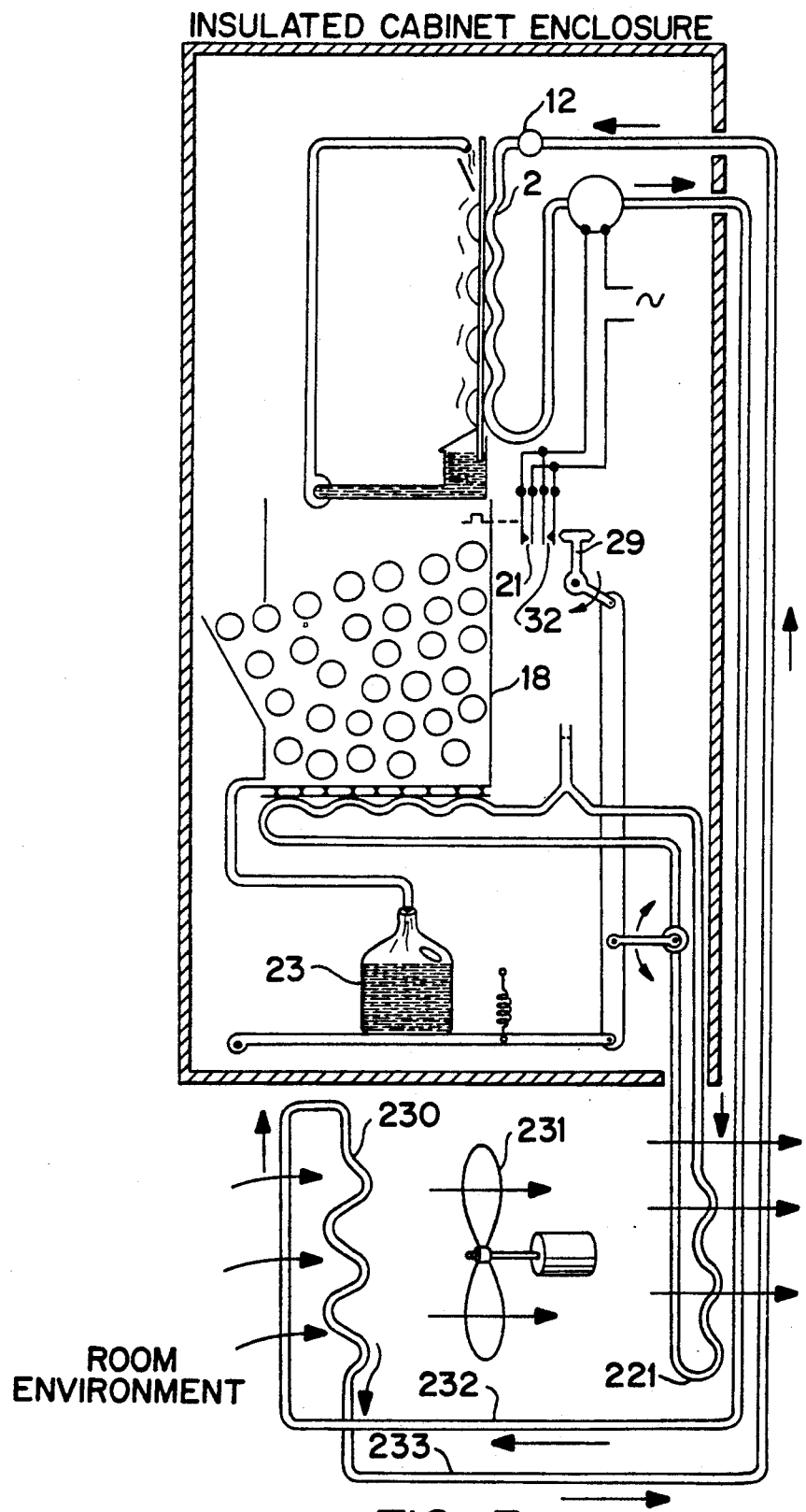
FIG. 3 is a schematic flow diagram of still another embodiment of the system of the present invention.

FIG. 3 illustrates an embodiment similar to the embodiment of FIG. 2 except that the system condenser 230 is specifically air cooled. Condenser fan 231 draws ambient air, warmed by the room environment, over the tubes of condenser 230 where it is warmed further and passes over warming coil 221. This arrangement provides more effective heating by warming coil 221. In this arrangement it is necessary that the system condenser be mounted in a location below the ice bin 18; accordingly, a longer discharge line 232 and longer liquid line 233 are employed.

From the foregoing description it will be appreciated that the invention makes available a novel method and apparatus for efficiently melting ice collected in a bin as part of an ice-forming process in which the ice is formed as purified ice pieces from an unpurified source of water, and wherein the purified ice is melted to provide a supply of purified water.

Having described preferred embodiments of a new and improved ice maker and water purifier with controlled condensing temperature in accordance with the present invention, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method for providing a supply of purified ice and a supply of purified liquid water from a source of unpurified liquid water, said method comprising the steps of:
   (a) cooling selected areas of at least one ice-forming surface to a temperature below the freezing temperature of water;
   (b) directing a water stream of the unpurified liquid water over said selected areas to form ice at said selected areas while washing impurities away from the formed ice with said stream;
   (c) increasing the temperature at said selected areas at various times to remove said ice from said ice-forming surface;
   (d) collecting the ice removed in step (c) in a bin;
   (e) warming a portion of said bin at selected times to melt some of the ice therein into purified liquid water;
   (f) collecting in a container the purified liquid water derived in step (e);
   wherein step (a) includes conducting thermal energy to at least one evaporator passage from said selected areas of said ice-forming surface;
   wherein said evaporator passage is part of a continuous refrigerant flow path for refrigerant fluid, said flow path including a compressor, a condenser, a metering device and the evaporator passage, wherein step (a) includes energizing said compressor, and wherein said method further comprises the steps of:
   (g) sensing the amount of collected ice in said bin;
   (h) sensing the amount of collected purified liquid water in said container;

(i) in response to both the amount of said collected ice in said bin exceeding a first predetermined amount, and the amount of said collected purified liquid water in said container exceeding a second predetermined amount, deenergizing said compressor; and (j) following step (i), re-energizing said compressor whenever either or both of the following occurs: (1) the amount of collected ice in said bin falls below the first predetermined amount; and (2) the amount of collected purified liquid water in said container falls below the second predetermined amount; and wherein step (e) includes the steps of passing a flow of fluid heated by the ambient environment along the underside of said bin in response to the amount of collected purified water in said container being below the said second predetermined amount; and causing said fluid to be cooled by said passing; and then conducting said fluid in the cooled condition downward in a convective flow through a conduit to a location having at least a temperature of the ambient environment.

* * * * *